(12) United States Patent
Boku (10) Patent No.: US 8,830,699 B2
(45) Date of Patent: Sep. 9, 2014

(54) CONTROL CIRCUIT OF SWITCHING POWER SUPPLY SYSTEM AND SWITCHING POWER SUPPLY SYSTEM

(75) Inventor: Kokou Boku, Matsumoto (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 222 days.

(21) Appl. No.: 13/614,809

(22) Filed: Sep. 13, 2012

(65) Prior Publication Data

US 2013/0063987 A1 Mar. 14, 2013

(30) Foreign Application Priority Data

Sep. 13, 2011 (JP) ................................. 2011-199175

(51) Int. Cl.
*H02M 3/335* (2006.01)
(52) U.S. Cl.
USPC ........................... 363/16; 363/21.17; 323/299
(58) Field of Classification Search
USPC ........... 363/16, 21.12, 21.17, 21.18; 323/282, 323/299
See application file for complete search history.

(56) References Cited

U.S. PATENT DOCUMENTS

| 6,100,675 | A | 8/2000 | Sudo | |
| 6,597,159 | B2 * | 7/2003 | Yang | 323/283 |
| 7,986,188 | B2 * | 7/2011 | Fujiwara | 330/292 |
| 8,405,374 | B2 * | 3/2013 | Tomita et al. | 323/284 |
| 2012/0194162 | A1 * | 8/2012 | Lin et al. | 323/304 |

FOREIGN PATENT DOCUMENTS

| JP | 11-155281 A | 6/1999 |
| JP | 2004-040856 A | 2/2004 |

* cited by examiner

*Primary Examiner* — Jessica Han
(74) *Attorney, Agent, or Firm* — Rabin & Berdo, P.C.

(57) ABSTRACT

An input voltage detection unit detects whether an AC input voltage is the voltage of a 100V system or of a 200V system. In response, a frequency decreasing gain setting unit switches between frequency decreasing gain characteristics relative to load factors. The frequency decreasing gain characteristics are established so that the initiation of a decrease in a feed back signal in the 100V system is earlier than that in the 200V system. By switching the frequency decreasing gain characteristics based on an AC input signal, the characteristics, in which a decrease in a feed back signal in the 200V system is earlier than that in the 100V system, are cancelled to allow load factors, at each of which a power supply operation frequency reaches the audible region, to be approximately the same to enable a vibration isolating measure to be independent of the AC input voltage.

10 Claims, 8 Drawing Sheets

|  | 200V SYSTEM | 100V SYSTEM |
|---|---|---|
| R1 [Ω] <br> R1+R1' [Ω] | 62.5 | 80.8 |
| R2 [Ω] <br> R2+R2' [Ω] | 145 | 175 |
| R3 [Ω] | 175 | 175 |
| k | 5.0069 | 4.1658 |
| m | 6.0345 | 5 |
| Vfb1 [V] | 1.7045 | 1.8004 |
| Vfb2 [V] | 1.2052 | 1.2002 |

VDD=5[V], Vfb1 ARE VALUES FOR Vo=VDD/2, Vfb2 ARE VALUES FOR Vo=0

CONTROL CIRCUIT OF SWITCHING POWER SUPPLY SYSTEM AND SWITCHING POWER SUPPLY SYSTEM

CROSS-REFERENCE TO RELATED APPLICATION

This application is based on, and claims priority to, Japanese Patent Application No. 2011-199175, filed on Sep. 13, 2011, contents of which are incorporated herein by reference.

BACKGROUND OF INVENTION

1. Field of the Invention

The present invention relates to the control circuit of a flyback-type switching power supply system and the flyback-type switching power supply system and more particularly to the control circuit of a switching power supply system and the switching power supply system which are formed so as not to vary the characteristics of a power supply operation frequency to a load factor even though the voltage of an AC input differs.

2. Background Art

A switching power supply system is able to convert a commercial AC voltage to a DC voltage with an arbitrary voltage to output the DC voltage. The system has a low parts count and is adaptable to a wide range of input voltages. As a system in which an output voltage is isolated from the voltage of a commercial power supply, the system of a flyback-type is known. The flyback-type switching power supply system is provided with an input circuit that converts an AC input voltage to a DC voltage, a transformer, a switching device, an output circuit that converts a secondary side voltage of the transformer to a DC voltage (an output voltage) and a control circuit that carries out on-off control of the switching device. The control circuit controls the turning-on width of the switching device connected in series to the primary winding of the transformer on the basis of the output voltage of the output circuit to thereby carry out control so that the output voltage becomes constant.

The control circuit also detects the load condition of the switching power supply system. In the case when the system is under a high-load condition, the control circuit controls the turning-on and -off of the switching device by a fixed high frequency wave. In the case when the system becomes under a light-load condition, however, the control circuit generally carries out a control in which the switching frequency of the switching device is decreased to decrease a switching loss (see JP-A-11-155281 and JP-A-2004-40856 (Paragraph [0025] and FIG. 11), for example).

In the invention described in JP-A-11-155281, although the invention is not the invention of a flyback-type switching power supply system, an output voltage is detected for maintaining a high switching frequency when the output voltage is decreased under a high-load condition. Meanwhile, an increase in the output voltage due to a light-load condition decreases the switching frequency with the increase in the output voltage so as to thereby improve the efficiency of the light-load.

Similarly, in the invention described in JP-A-2004-40856, the voltage of an output circuit is also detected and when the value of a fed back voltage is equal to or more than a specified value, a capacitor that determines the oscillation period of an oscillator is charged by a constant bias current to make the oscillator oscillate at a certain constant oscillation frequency. In a region in which the value of the fed back voltage is equal to or less than a specified value, the value of a bias current to be charged in the capacitor decreases to lengthen a charging time until the voltage across the capacitor exceeds the threshold level, by which the switching frequency is going to decrease.

In this way, a switching power supply system has a decreasing characteristic of an oscillation frequency to a load factor. When making the specification of such a switching power supply system in compliance with a worldwide specification, commercial power supplies of a 100V system and a 200V system are to be connected to the AC input of the system. At this time, the switching power supply system is designed so as to be in compliance with a wide range of AC input voltages with components and various kinds of set values designed to be identical.

Figure 10:
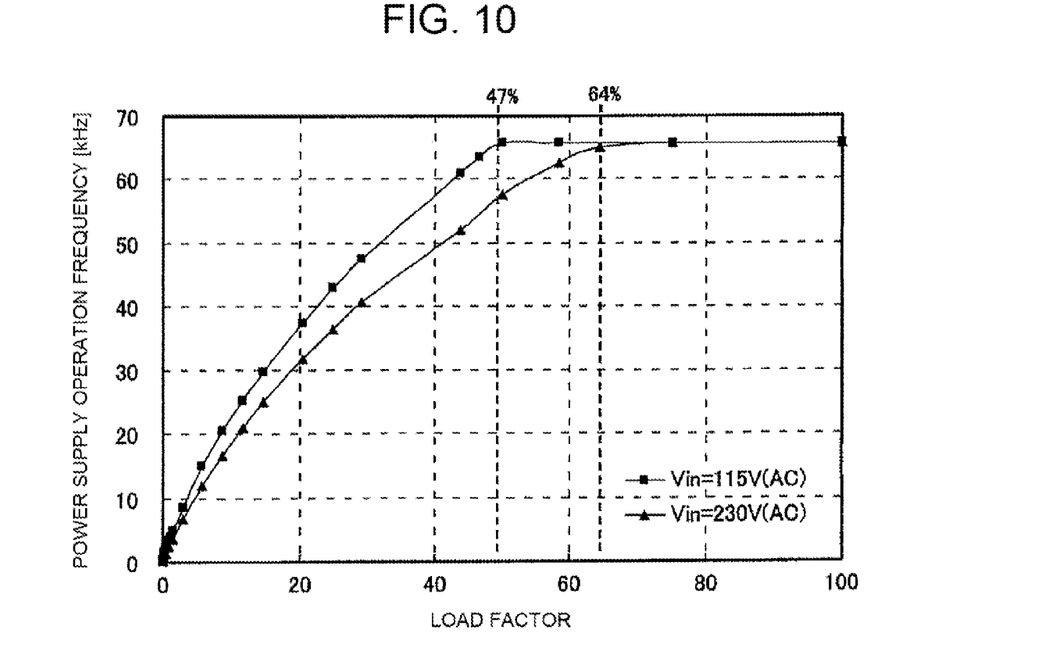
FIG. 10 is a characteristic diagram showing power supply operation frequency decreasing characteristics to load factors for different AC input voltages.

FIG. 10 is a characteristic diagram showing power supply operation frequency decreasing characteristics relative to load factors for different AC input voltages.

The characteristic diagram shown in FIG. 10 has the horizontal axis representing load factor and the vertical axis representing power supply operation frequency to show power supply operation frequency (switching frequency) decreasing characteristics relative to the load factor in the cases in which the values of the AC input voltages Vin are for the 100V system (AC115V) and for the 200V system (AC230V).

According to the characteristic diagram, in each of the cases in which the values of the AC input voltages Vin are for the 100V system and for the 200V system, the characteristic is presented so that under a condition with a load factor being higher than a certain one, the power supply operation frequency is constant and under a condition with a load factor being lower than a certain one, the power supply operation frequency decreases with a decrease in the load factor. However, while the load factor at which the power supply operation frequency initiates to decrease is 47% in the 100V system, such load factor becomes 54% in the 200V system. This is because, under conditions of the same power supply operation frequency and load factor, a higher AC input voltage brings a higher increasing rate of the energy stored in a transformer, by the increased amount of which energy the amount of feedback increases so as to narrow the turning-on period of the switching device to result in the initiation of a decrease in the power supply operation frequency at a higher load factor.

In a switching power supply system, a power supply operation frequency as a switching frequency decreases as a load becomes lower to finally enter the audible region. With a switching frequency in the audible region, the core of a transformer vibrates at the frequency in the audible region. This causes a sounding phenomenon that produces abnormal sound from a transformer. Therefore, when the power supply operation frequency decreases to the audible region, a vibration isolating measure of some kind becomes necessary.

However, in the case where an AC input voltage is the voltage of the 100V system and in the case where an input AC voltage is the voltage of the 200V system, their respective power supply operation frequency decreasing characteristics show different ones in which their respective timings differ at each of which the power supply operation frequency enters the audible region. This caused a problem in that the switching power supply system, although it is in compliance with a world wide specification in the configuration, requires individual adjustments for vibration isolation depending on the magnitude of the power supply voltage to be used with respect to the vibration isolating measure.

The invention was made in view of such point with an object of providing a control circuit of a switching power supply system and the switching power supply system which require no vibration isolating measures depending on the magnitude of an AC input voltage.

SUMMARY OF THE INVENTION

In the invention, for solving the problems, a control circuit of a flyback-type switching power supply system is provided, which circuit carries out control so as to decrease the switching frequency of a switching device when the load factor of a load decreases to be lower than the specified load factor. The control circuit includes an input voltage detection unit, having an AC input voltage inputted, for detecting whether the AC input voltage is the voltage of a high voltage system or the voltage of a low voltage system. Moreover, the control circuit includes a frequency decreasing gain setting unit provided so as to switch the decreasing gain characteristics of the switching frequencies relative to the load factor according to the result of the detection of the AC input voltage carried out by the input voltage detection unit.

Moreover, in the invention, a flyback-type switching power supply system is provided with a control circuit carrying out control so as to decrease the switching frequency of a switching device when the load factor of a load decreases to be lower than the specified load factor. The control circuit has an input voltage detection unit having an AC input voltage inputted and detecting whether the AC input voltage is the voltage of a high voltage system or the voltage of a low voltage system. Moreover, the control circuit has a frequency decreasing gain setting unit switching the decreasing gain characteristics of the switching frequencies relative to the load factor according to the result of the detection of the AC input voltage carried out by the input voltage detection unit to carry out control so that no characteristics of the switching frequencies to the load factor are changed both in the high voltage system and in the low voltage system. The control circuit further has a variable frequency oscillation unit determining the switching frequency by the output voltage of the frequency decreasing gain setting unit.

According to such a control circuit of a switching power supply system and the switching power supply system, the frequency decreasing gain setting unit has the frequency decreasing gain characteristic for the high-voltage system and the frequency decreasing gain characteristic for the low-voltage system, which have been made so as to be switched between them according to the AC input voltage. This can provide the frequency characteristic relative to a load factor when the power supply system is operated with the high-voltage system and the characteristic when the power supply system is operated with the low-voltage system as being approximately the same, which characteristics were different in the related switching power supply system. Thus, the timings at which decreasing power supply operation frequencies enter their respective audible regions can be made to be approximately the same both in the high-voltage system and in the low-voltage system. Therefore, one vibration isolating measure can be provided as being common to the operation in the high-voltage system and the operation in the low-voltage system against sounding phenomena occurring at that time.

Each of the control circuit of a switching power supply system and the switching power supply system with the configuration as was described in the foregoing has two kinds of frequency decreasing gain characteristics, which were switched according to AC input voltages so that no change appears in the power supply operation frequency characteristics relative to the load factor. Thus, although a sounding phenomenon sometimes occurs when the power supply operation frequency decreases down to the audible region, there is the advantage of requiring no vibration isolation measures for each of the AC input voltages.

DETAILED DESCRIPTION

In the following, explanations will be made in detail with respect to an embodiment of the invention with reference to attached drawings.

Figure 1:
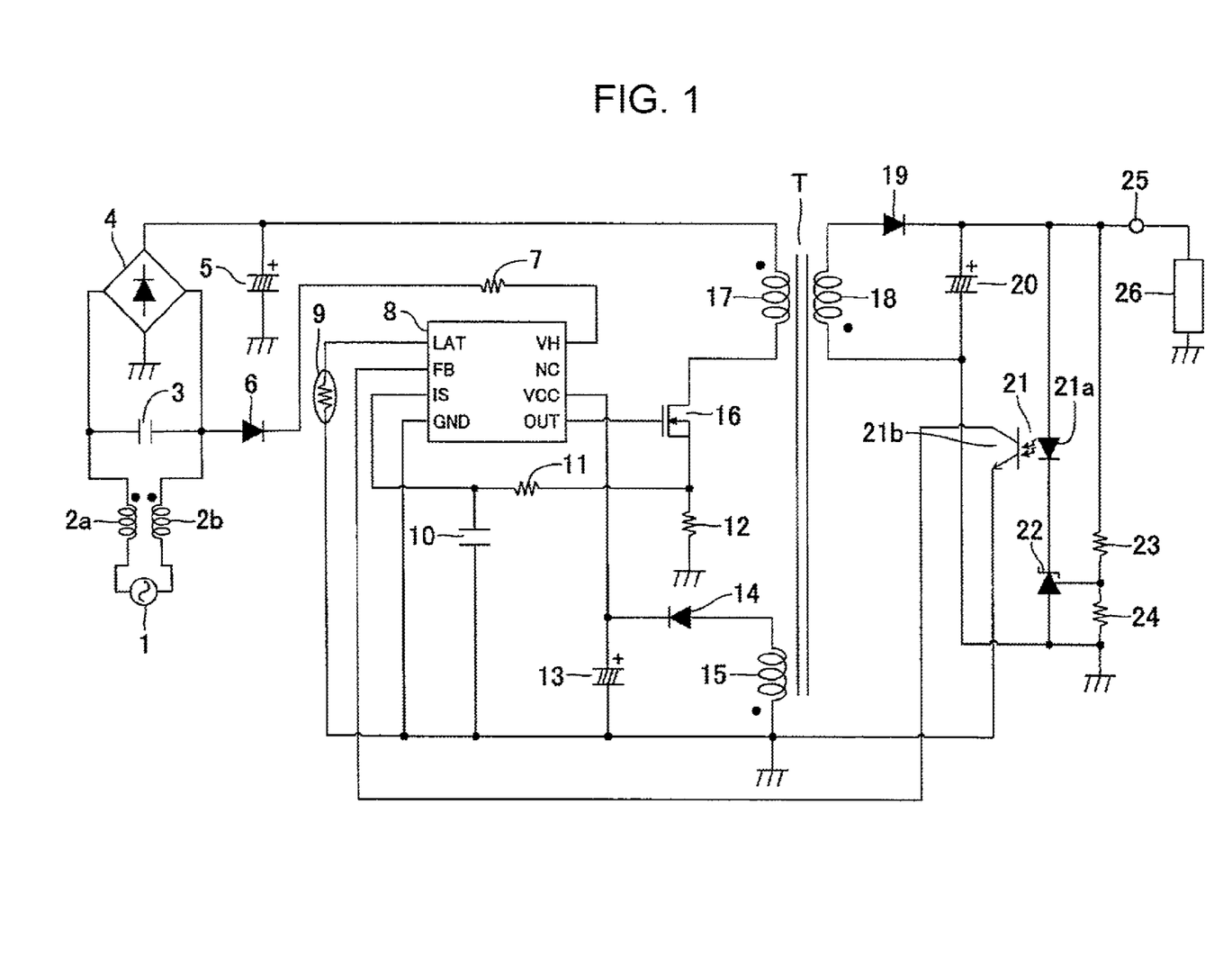
FIG. 1 is a circuit diagram showing the circuit configuration of a switching power supply system containing a control circuit according to the embodiment.

FIG. 1 is a circuit diagram showing the circuit configuration of a switching power supply system containing a control circuit according to the embodiment.

The switching power supply system is used by connecting the system to a commercial AC power supply 1. One of the terminals of the AC power supply 1 is connected to one end of a winding 2a forming a transformer and the other terminal of the AC power supply 1 is connected to one end of a winding 2b forming the transformer. The other end of the winding 2a is connected to one terminal of a capacitor 3 and the other end of the winding 2b is connected to the other terminal of the capacitor 3. The windings 2a and 2b and the capacitor 3 form an input filter, which has a function of inhibiting a current with a high frequency such as a power supply operating frequency from passing the input filter.

Both of the terminals of the capacitor 3 are connected to their respective AC input terminals of a diode bridge 4. The positive terminal of the diode bridge 4 is connected to the positive terminal of a capacitor 5 and the negative terminal of the diode bridge 4 is grounded. To one of the terminals of the capacitor 3, the anode of a diode 6 is connected and the cathode of the diode 6 is connected to the VH terminal of a control circuit 8 through a current-limiting resistor 7.

The control circuit 8 is formed with an integrated circuit, which is provided with terminals such as an LAT terminal for overheat latch protection, an FB terminal for feedback control, an IS terminal for current detection, a GND terminal for grounding, a VCC terminal for internal power supply production and an OUT terminal for outputting a switching signal.

The LAT terminal in the control circuit 8 is connected to one end of a thermistor 9, the other end of which is grounded. The FB terminal of the control circuit 8 is connected to the collector terminal of a phototransistor 21b of a photocoupler 21 in an output circuit that will be described later so that a signal corresponding to an output voltage is inputted to the FB terminal. The IS terminal of the control circuit 8 is connected to the common connection point of a capacitor 10 and a resistor 11. The other end of the capacitor 10 is grounded and the other end of the resistor 11 is connected to a sensing resistor 12. The capacitor 10 and resistor 11 form a noise filter for a signal detected by the sensing resistor 12. The VCC terminal of the control circuit 8 is connected to the positive terminal of a capacitor 13 and the cathode terminal of a diode 14 with the negative terminal of the capacitor 13 grounded. The anode terminal of the diode 14 is connected to one end of an auxiliary winding 15 of a transformer T with the other end of the auxiliary winding 15 grounded. The capacitor 13, diode 14 and auxiliary winding 15 form a circuit that converts an AC voltage generated in the auxiliary winding 15 to a DC voltage, which circuit forms a power supply circuit of the control circuit 8. The OUT terminal of the control circuit 8 is connected to the control terminal of a switching device 16. For the switching device 16, an N-channel MOSFET (Metal-Oxide-Semiconductor Field-Effect Transistor) is used in the example shown in the drawing. The gate terminal of the MOSFET is connected to the OUT terminal of the control circuit 8, the source terminal thereof is grounded through the sensing resistor 12 and the drain terminal thereof is connected to one end of a primary winding 17 of the transformer T. The other end of the primary winding 17 of the transformer T is connected to the positive terminal of the capacitor 5.

The transformer T has a secondary winding 18, one end of which is connected to the anode terminal of a diode 19. The cathode terminal of the diode 19 is connected to the positive terminal of a capacitor 20, the negative terminal of which is connected to the other end of the secondary winding 18 and grounded. The secondary winding 18, the diode 19 and the capacitor 20 form a circuit that converts an AC voltage generated in the secondary winding 18 to a DC voltage and form the output circuit of the switching power supply system.

The positive terminal of the capacitor 20 is connected to the anode terminal of the light emitting diode 21a of the photocoupler 21 and the cathode terminal of the light emitting diode 21a is connected to the cathode terminal of a shunt regulator 22, the anode terminal of which is grounded. The shunt regulator 22 is connected to the connection point of a resistor 23 and a resistor 24 which are connected in series between the positive terminal and the negative terminal of the capacitor 20. The voltage across the capacitor 20 as an output voltage of the output circuit is divided by the resistors 23 and 24 to be compared with an unillustrated reference voltage. The phototransistor 21b of the photocoupler 21 has the collector terminal thereof connected to the FB terminal of the control circuit 8 and has an emitter terminal thereof grounded. The positive terminal of the capacitor 20 is connected to the output terminal 25 of the switching power supply system and the output terminal 25 is connected to a load 26.

In the switching power supply system with the configuration explained in the foregoing, the AC input voltage of the AC power supply 1 is supplied to the diode bridge 4 through the input filter formed with the windings 2a and 2b of the transformer and the capacitor 3. At the diode bridge 4, the voltage supplied from the input filter is subjected to full-wave rectification and is smoothed by the capacitor 5 to become a DC voltage. The DC voltage to which the AC input voltage is rectified and smoothed is supplied to the primary winding 17 of the transformer T. Moreover, a pulsating voltage to which the AC input voltage is subjected to half-wave rectification by the diode 6 is supplied to the VH terminal of the control circuit 8 through the current-limiting resistor 7.

The control circuit 8 starts the operation thereof by receiving the pulsating voltage to initiate the on-off control of the switching device 16. The turning on of the switching device 16 makes a current flow into the ground through the primary winding 17 of the transformer T, the switching device 16 and the sensing resistor 12, by which energy is stored in the core of the transformer T. At this time, the secondary winding 18 of the transformer T, having the phase of the output voltage made reversed to the phase of the input voltage of the primary winding 17, makes the voltage on the secondary side reverse-biased by the diode 19. Thus, no current flows on the secondary side.

The turning-off of the switching device 16 causes no current to flow on the primary side of the transformer T. However, for releasing the energy stored in the transformer T from the secondary side, a current flows in the forward direction in the diode 19. The current flows toward the capacitor 20 and toward the load 26.

As was explained in the foregoing, by repeating the turning-on and -off operations of the switching device 16, the energy of the AC input voltage is stored in the transformer T. The stored energy is transmitted to the capacitor 20 on the secondary side and, along with this, is supplied to the load 26 from the output terminal 25. Similarly, a part of energy stored in the transformer T is also taken out from the auxiliary winding 15 of the transformer T to charge the capacitor 13 through the diode 14. The voltage across the capacitor 13 is supplied to the VCC terminal of the control circuit 8 as a power supply voltage of the control circuit 8.

The output voltage of the switching power supply system is detected by the shunt regulator 22 to be fed back to the FB terminal of the control circuit 8 through the photocoupler 21. The control circuit 8 carries out PWM (Pulse Width Modulation) control so that the output voltage becomes constant.

The shunt regulator 22 compares a voltage, to which the output voltage is divided by the resistors 23 and 24, with an inner reference voltage to control a current flowing in the light emitting diode 21a in the photocoupler 21 depending on the variation in the output voltage. The decrease in the output voltage under a high load decreases the current flowing in the light emitting diode 21a in the photocoupler 21 to decrease an amount of light emission. This causes decrease in an amount of light detected by the phototransistor 21b in the photocoupler 21. The phototransistor 21b, by the decrease in the amount of the detected light, increases the on-resistance thereof to increase the voltage inputted to the FB terminal of the control circuit 8. The control circuit 8, in response to the increase in the voltage inputted to the FB terminal, carries out control so as to increase the width of the voltage turning-on the switching device 16 to increase the output voltage. Conversely, an increase in the output voltage under a light-load condition increases the current flowing in the light emitting diode 21a in the photocoupler 21 to increase an amount of light emission. In the phototransistor 21b in the photocoupler 21, an increase in an amount of detected light decreases on-resistance to decrease the voltage inputted to the FB terminal of the control circuit 8. The control circuit 8, in response to the decrease in the voltage inputted to the FB terminal, carries out control so as to narrow the width of the voltage turning-on the switching device 16 to decrease the output voltage. In this way, the shunt regulator 22 monitors the output voltage and the photocoupler 21 carries out the feedback of the monitored voltage to the control circuit 8, by which the control circuit 8 carries out PWM control so that the output voltage becomes constant.

Here, as was explained in the foregoing, under the condition in which the conditions of power supply operation frequencies and load factors are identical, the higher an AC input voltage becomes, the higher an increasing rate of energy stored in the transformer in the turning-on period of a switching device becomes to increase the amount of feedback so as to narrow the width of the voltage turning-on the switching device by the increased amount of the increasing rate of energy. Thus, a decrease in the voltage inputted to the FB terminal in a 200V system initiates at a voltage higher than the voltage in a 100V system.

The control circuit 8 also has a function that decides the load factor of the load 26 on the basis of the voltage inputted to the FB terminal as a feedback voltage of the output voltage supplied through the photocoupler 21 (as was described in the foregoing, as a load factor becomes higher, the voltage inputted to the FB terminal becomes higher, and as a load factor becomes lower, the voltage inputted to the FB terminal becomes lower), and varies the power supply operation frequencies according to the load factor. This will be explained in the following.

Figure 2:
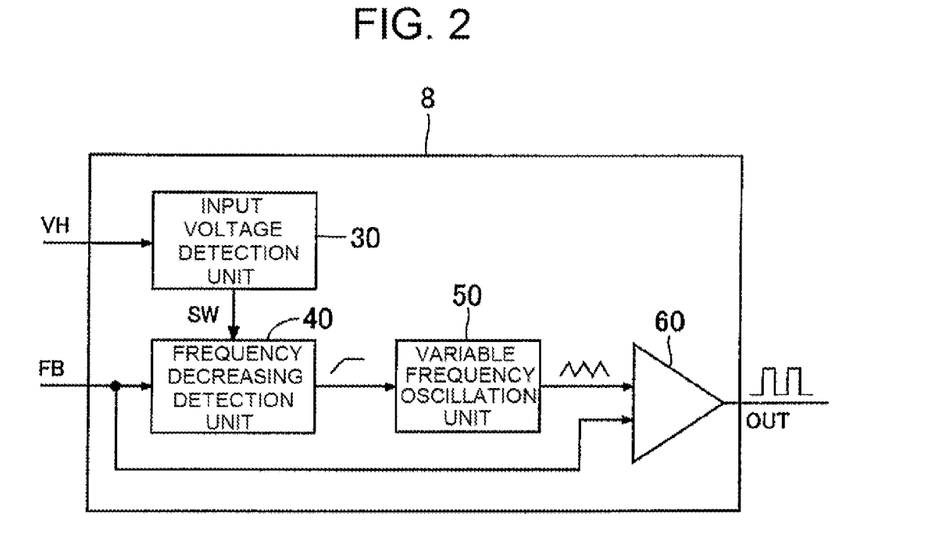
FIG. 2 is a block diagram showing a section related to the variable power supply operation frequency function in the control circuit.

FIG. 2 is a block diagram showing a section related to the variable power supply operation frequency function in the control circuit.

The control circuit 8 is provided with an input voltage detection unit 30, a frequency decreasing gain setting unit 40, a variable frequency oscillation unit 50 and a driving circuit 60. The input voltage detection unit 30 detects whether the voltage of the AC power supply 1 is the voltage of the 100V system or the voltage of the 200V system from the pulsating voltage inputted to the VH terminal. The frequency decreasing gain setting unit 40 carries out switching of frequency decreasing gain characteristics according to the results of the detection carried out by the input voltage detection unit 30 to set a frequency decreasing gain by further deciding a load factor from the voltage inputted to the FB terminal. The variable frequency oscillation unit 50 produces a triangular wave having a power supply operating frequency according to the frequency decreasing gain characteristic set by the frequency decreasing gain setting unit 40. The driving circuit 60 compares the voltage of the triangular wave having the power supply operating frequency produced by the variable frequency oscillation unit 50 with the voltage inputted to the FB terminal to produce and amplify a PWM signal for carrying out the PWM control of the switching device 16 to drive the switching device 16.

In the following, explanations will be made with respect to details of the specific configurations and operations of the input voltage detection unit 30, the frequency decreasing gain setting unit 40 and the variable frequency oscillation unit 50 with reference to the attached drawings.

Figure 3:
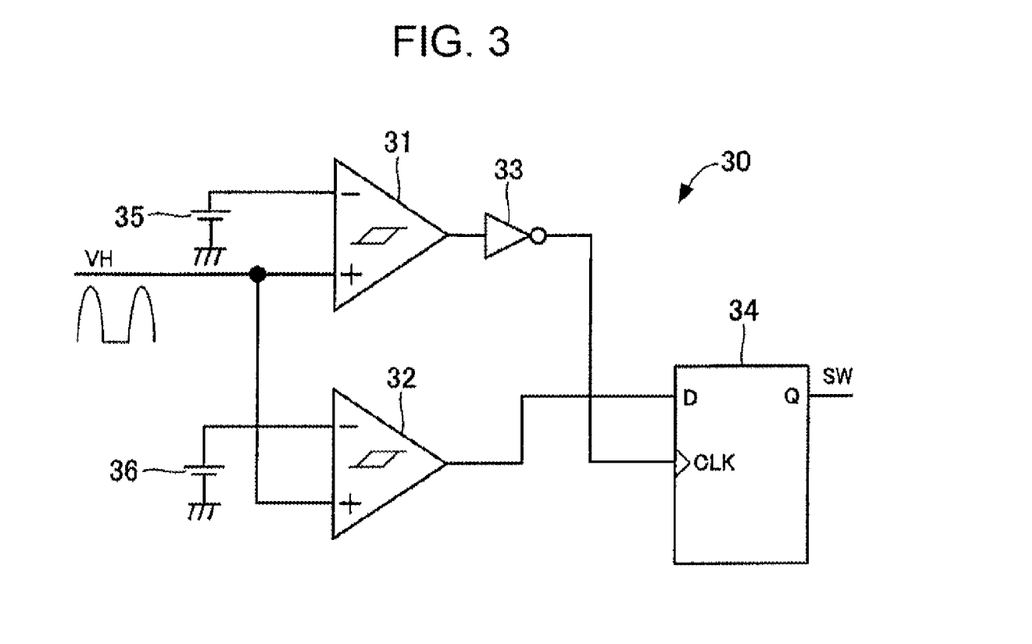
FIG. 3 is a circuit diagram showing an example of the configuration of an input voltage detection unit.
Figure 4:
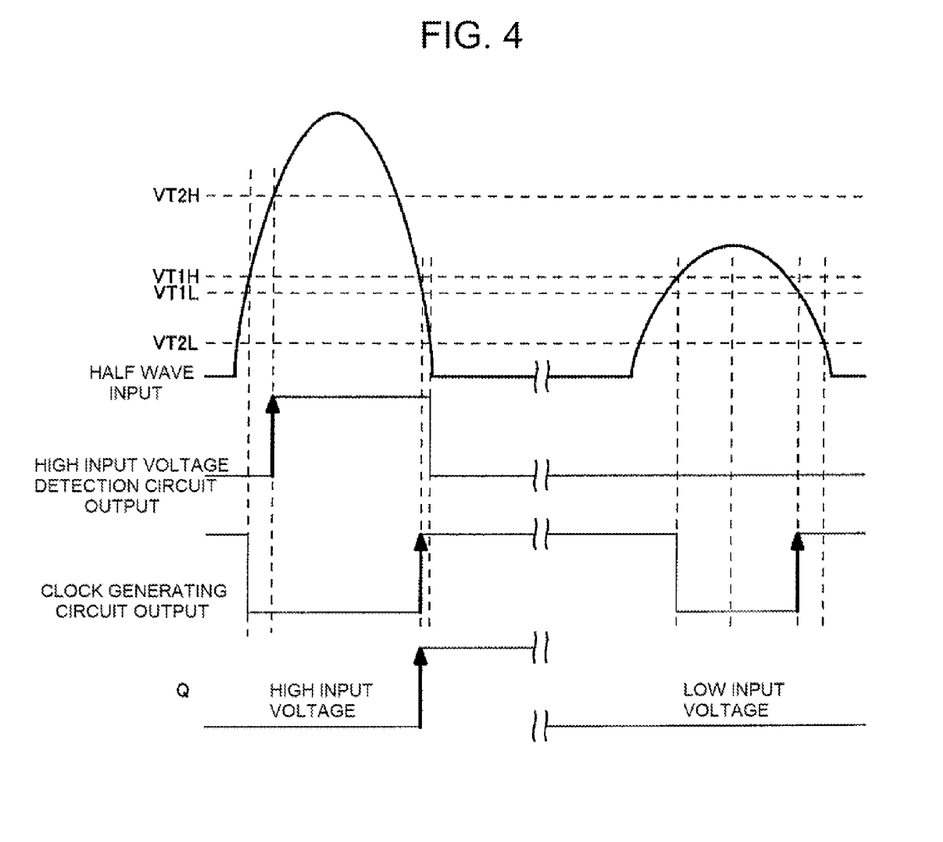
FIG. 4 is an explanatory diagram of the operation of the input voltage detection unit.

FIG. 3 is a circuit diagram showing an example of the configuration of the input voltage detection unit 30 and FIG. 4 is an explanatory diagram of the operation of the input voltage detection unit 30.

The input voltage detection unit 30 is provided with two hysteresis comparators 31 and 32, an inverter 33 and a D-type flip-flop circuit 34. Each of the hysteresis comparators 31 and 32 has a non-inverting input terminal connected to the VH terminal of the control circuit 8. The output of the hysteresis comparator 31 is connected to the input of the inverter 33, the output of which is connected to the clock input terminal CLK of the D-type flip-flop circuit 34. The output of the hysteresis comparator 32 is connected to the data input terminal D of the D-type flip-flop circuit 34. In actuality, the VH terminal and the non-inverting input terminal of each of the hysteresis comparators 31 and 32 are not directly connected but are connected through an unillustrated voltage dividing circuit. Namely, a voltage to which the voltage at the VH terminal is divided to be a low voltage is inputted to the non-inverting input terminal of each of the hysteresis comparators 31 and 32. For making the relations among the voltages understandable, explanations in the following will be made on the assumption that the voltage at the VH terminal is directly inputted to the non-inverting input terminal of each of the hysteresis comparators 31 and 32 (the explanation is correct when relating circuit components are those with high breakdown voltages). The input voltages, however, are actually divided as was explained in the foregoing with the values of relevant reference voltages provided as corresponding to the divided voltages.

The hysteresis comparator 31 and the inverter 33 form a clock generating circuit and the hysteresis comparator 32 forms a high input voltage detection circuit. The hysteresis comparator 31 has a reference voltage source 35 connected to the inverting input terminal thereof for setting a threshold voltage for comparison and the hysteresis comparator 32 has a reference voltage source 36 connected to the inverting input terminal thereof for setting a threshold voltage for comparison. Each of the reference voltage sources 35 and 36 has two values for setting a hysteresis characteristic. Namely, as shown in FIG. 4, the reference voltage source 35 of the hysteresis comparator 31 has threshold values VT1H and VT1L and the reference voltage source 36 of the hysteresis comparator 32 has threshold values VT2H and VT2L. The threshold values VT1H and VT1L are lower than the peak value of the waveform of half-wave rectification of the 100V system and are set to values satisfying the condition of VT1H>VT1L. The threshold value VT2H is set to a value higher than the peak value of the waveform of half-wave rectification of the 100V system and lower than the peak value of the waveform of half-wave rectification of the 200V system. Moreover, the threshold value VT2L is set to a value satisfying the condition of VT1L>VT2L.

Here, an explanation will be made with respect to an operation in the case when an AC power supply of the 200V system is to be connected as the AC power supply 1 and a voltage with a waveform of half-wave rectification of the AC power supply 1 (the waveform shown in the left half of FIG. 4) is to be inputted to the VH terminal. First, until a voltage with the waveform of half-wave rectification is inputted, each of the hysteresis comparators 31 and 32, the input voltages to the non-inverting input terminals of which being at a level of approximately zero, outputs a voltage being at a low (L) level. Thus, the output voltage of the inverter 33, receiving the L level voltage, is at a high (H) level. On receiving an input voltage with a waveform of half-wave rectification of the 200V system, the hysteresis comparator 31 first outputs a voltage at the H level when the level of the half-wave rectified voltage becomes equal to or more than the threshold value VT1H. The inverter 33, on receiving the voltage at the H level, outputs a voltage at the L level. Subsequent to this, the hysteresis comparator 32 outputs a voltage at the H level when the half-wave rectified voltage becomes equal to or more than the threshold value VT2H. Thereafter, the hysteresis comparator 31 outputs a voltage at the L level when the level of the half-wave rectified voltage becomes equal to or less than the threshold value VT1L. The inverter 33, on receiving the voltage at the L level, outputs a voltage at the H level. At this time, the D-type flip-flop circuit 34, at the rising edge of the output voltage of the inverter 33 inputted to the clock input terminal CLK, inputs the data inputted to the data input terminal D, i.e.

the data at the H level, holds the value thereof and outputs the data from the output terminal Q. The output signal from the output terminal Q is inputted to the frequency decreasing gain setting unit 40 as a switching signal SW. The value of the output signal at the H level from the output terminal Q is not changed as long as the input voltage detection unit 30 detects the voltage with the half-wave rectified waveform of the 200V system.

In the case when an AC power supply of the 100V system is connected as the AC power supply 1 (the waveform shown in the right half of FIG. 4), the hysteresis comparator 31 outputs a voltage at the H level when the level of the half-wave rectified voltage becomes equal to or more than the threshold value VT1H and outputs a voltage at the L level when the level of the half-wave rectified voltage becomes equal to or less than the threshold value VT1L. According to this, the inverter 33 outputs a voltage at the L level or H level. The hysteresis comparator 32 of the high input voltage detection circuit has no voltage equal to or more than the threshold value VT2H applied to the non-inverting input terminal thereof. Therefore, the output thereof is kept at the L level. Consequently, in the D-type flip-flop circuit 34, the data inputted to the data input terminal D at the rising edge of the signal inputted to the clock input terminal CLK is kept at the L level. Thus, a signal with the value of the inputted data, namely a signal at the L level, is outputted from the output terminal Q. The value of the output signal at the L level from the output terminal Q is not changed as long as the input voltage detection unit 30 detects the voltage with the half-wave rectified waveform of the 100V system.

As was explained in the foregoing, the input voltage detection unit 30 detects whether the voltage of the AC power supply 1 is the voltage of the 100V system or the voltage of the 200V system. When the voltage of the AC power supply 1 is the voltage of the 100V system, the input voltage detection unit 30 outputs a signal at the L level as the switching signal SW. When the voltage of the AC power supply 1 is the voltage of the 200V system, the input voltage detection unit 30 outputs a signal at the H level as the switching signal SW.

Figure 5:
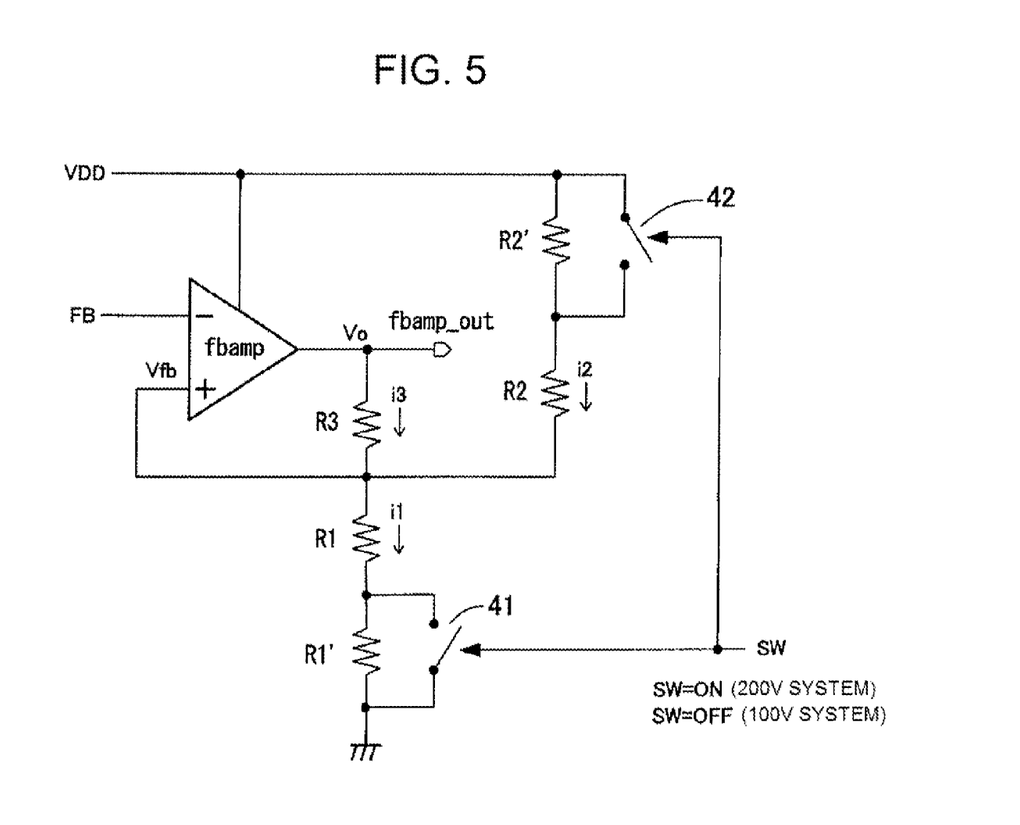
FIG. 5 is a circuit diagram showing an example of the configuration of the frequency decreasing gain setting unit.
Figure 6:
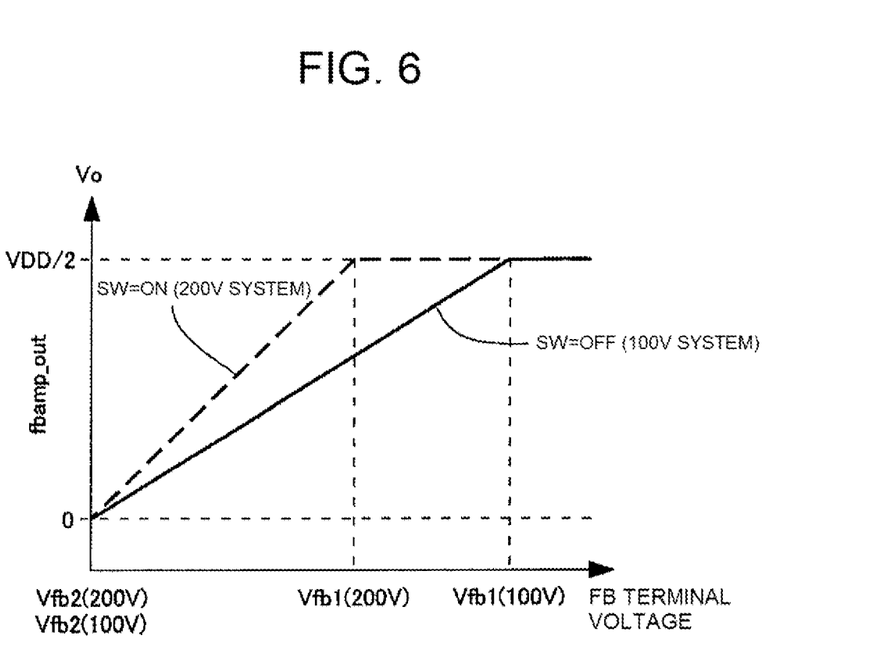
FIG. 6 is a diagram showing gain characteristics of the example of the configuration of the frequency decreasing gain setting unit shown in FIG. 5.
Figure 7:
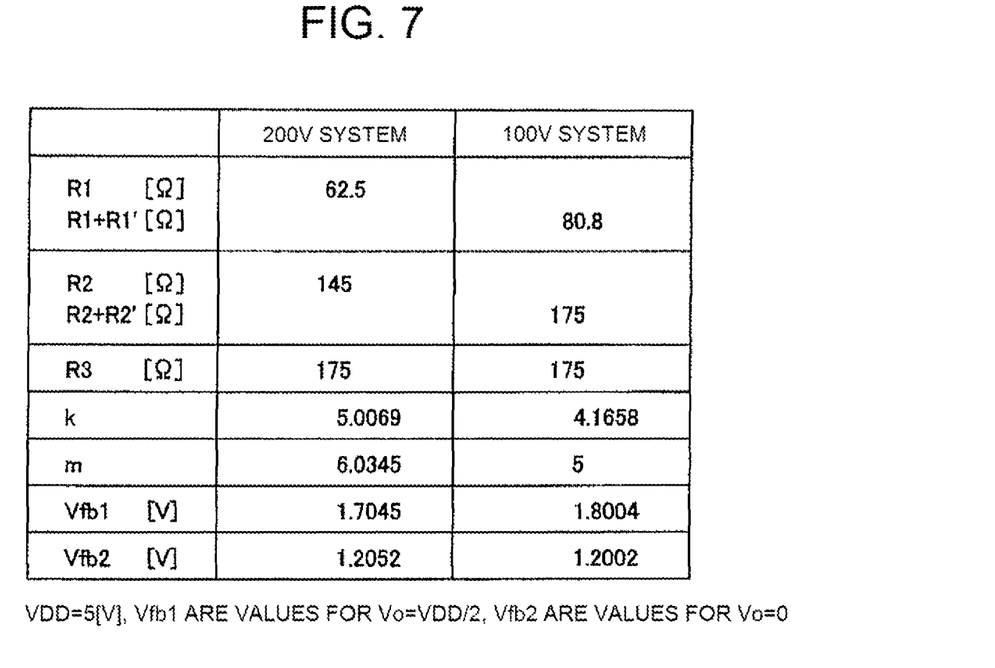
FIG. 7 is a table showing numerical values for the constituents forming the example of the configuration of the frequency decreasing gain setting unit shown in FIG. 5.

FIG. 5 is a circuit diagram showing an example of the configuration of the frequency decreasing gain setting unit 40, FIG. 6 is a diagram showing gain characteristics of the example of the configuration of the frequency decreasing gain setting unit 40 shown in FIG. 5, and FIG. 7 is a table showing numerical values for the constituents forming the example of the configuration of the frequency decreasing gain setting unit 40 shown in FIG. 5.

The frequency decreasing gain setting unit 40 has an amplifier (operational amplifier) fbamp, to the inverting input terminal of which the FB terminal of the control circuit 8 is connected. Between the ground potential and the potential of a power supply voltage VDD, resistors R1', R1, R2 and R2' are connected in series. The connection point of the resistor R1 and the resistor R2 is connected to the non-inverting input terminal of the amplifier fbamp and is further connected to the output terminal fbamp out of the amplifier fbamp through the resistor R3. Moreover, to the resistor R1', a switch 41 is connected in parallel and, to the resistor R2', a switch 42 is connected in parallel. Each of the switches 41 and 42 is formed with a semiconductor switch with the control terminal thereof formed so as to receive the switching signal SW from the input voltage detection unit 30. Namely, the switches 41 and 42 are closed (brought into conduction) on receiving the switching signal SW at the H level (SW=ON) from the input voltage detection unit 30 and are opened (brought into cutoff) on receiving the switching signal SW at the L level (SW=OFF). Here, the power supply voltage VDD is a voltage for which the voltage inputted to the VCC terminal of the control circuit 8 is processed to be a constant voltage.

The frequency decreasing gain setting unit 40 has two kinds of frequency decreasing gain characteristics each of which keeps an output voltage Vo constant when the FB terminal voltage is higher than a frequency decreasing initiation voltage and linearly decreases the output voltage Vo with a decrease in the FB terminal voltage when the FB terminal voltage decreases lower than the frequency decreasing initiation voltage. Depending on the level of the switching signal SW, the frequency decreasing gain characteristic to be used is selected for being established.

Next, an explanation will be made with respect to the two kinds of the frequency decreasing gain characteristics. For simplifying the explanation, the explanation will be made with respect to the frequency decreasing gain characteristic in a state in which the switches 41 and 42 are closed to short-circuit the resistors R1' and R2', i.e. in the 200V system. Here, as is shown in FIG. 5, the currents flowing in the resistor R1, the current flowing in the resistor R2 and the current flowing in the resistor R3 are denoted as i1, i2 and i3, respectively. Furthermore, the voltages at the non-inverting input terminal of the amplifier fbamp and the voltage at the output terminal fbamp out are denoted as Vfb and Vo, respectively. Then, the currents i1, i2 and i3 are expressed as follows. Incidentally, the voltage at the non-inverting input terminal of the amplifier fbamp becomes equal to the voltage Vfb at the FB terminal inputted to the inverting input terminal of the amplifier fbamp by the virtual short between the two input terminals of the amplifier fbamp.

$$i1 = i2 + i3 \quad (1)$$

$$i1 = Vfb/R1 \quad (2)$$

$$i2 = (VDD - Vfb)/R2 \quad (3)$$

$$i3 = Vo - Vfb)/R3 \quad (4)$$

where R1, R2 and R3 are resistance values of the resistors R1, R2 and R3, respectively.

Here, the output voltage Vo corresponds to the power supply operation frequency since the voltage Vo is converted into the power supply operation frequency in the variable frequency oscillation unit 50 as shown in FIG. 2. Moreover, the FB terminal voltage Vfb corresponds to the load factor as will be explained later.

By substituting expressions (2), (3) and (4) for i1, i2 and i3, respectively, in the expression (1) and arranging the expression (1) with respect to Vo, Vo is expressed as:

$$Vo = (R3/R1 + R3/R2 + 1) \cdot Vfb - (R3/R2) \cdot VDD. \quad (5)$$

Since there are no changes in the resistance value and the power supply voltage, by replacing such terms by constants k and m, respectively, the expression (5) can be expressed as $$Vo = k \cdot Vfb - m \quad (6)$$

where k and m are constants expressed as $$k = R3/R1 + R3/R2 + 1$$

and $$m = (R3/R2) \cdot VDD.$$

Here, the frequency decreasing gain characteristic, as shown in FIG. 6, has an inclination characteristic in that the output voltage Vo corresponding to the power supply operation frequency is constant when the FB terminal voltage corresponding to the load factor is higher than the voltage at a certain point and initiates a decrease when the FB terminal voltage becomes lower than the voltage at the point to become zero at another certain point of the FB terminal voltage. The inclination characteristic is expressed by the linear expression (6) with the inclination determined by the value of the constant k. Moreover, the FB terminal voltage Vfb1 at the point, from which a decrease in the power supply operation frequency is initiated, is a voltage when the output voltage Vo becomes, for example, Vo=VDD/2. Furthermore, the FB terminal voltage Vfb2 at the point, at which the power supply operation frequency decreases to the lowest frequency, is a voltage when the output voltage Vo becomes Vo=0 and is given as m/k. As was explained in the foregoing, the FB terminal voltage shows a higher value as a load factor becomes higher. Thus, the FB terminal voltage can be considered as being substantially synonymous with a load factor. However, as was explained in the foregoing, the correspondence of a load factor and an FB terminal voltage in the 100V system differs from the correspondence in the 200V system.

The frequency decreasing gain characteristic, as shown in FIG. 6, in the 200V system, becomes a characteristic with which the output voltage Vo corresponding to the power supply operation frequency varies from VDD/2 to zero (for example) when the FB terminal voltage corresponding to the load factor decreases lower than Vfb1 (200V).

In the case of the 100V system, the point at the FB terminal voltage corresponding to the load factor at which a decrease in the output voltage Vo corresponding to the power supply operation frequency is initiated is brought to be at an FB terminal voltage Vfb1 (100V) that is higher than the FB terminal voltage Vfb1 (200V) to provide a characteristic of initiating a decrease in the power supply operation frequency earlier than in the case of the 200V system. The power supply operation frequency decreasing gain characteristic of the 100V system shows an inclination of frequency decrease to the FB terminal voltage corresponding to the load factor more gradual than the inclination of the frequency decreasing gain characteristic of the 200V system. Moreover, the FB terminal voltage Vfb2 (100V) for the output voltage Vo corresponding to the lowest power supply operation frequency is preferably made to fit to the FB terminal voltage Vfb2 (200V) for the output voltage Vo corresponding to the lowest power supply operation frequency. The requirements can be satisfied by increasing the resistance values of the resistors R1 and R2 in the 100V system. Therefore, in the frequency decreasing gain setting unit 40, the resistors R1' and R2' with resistance values R1' and R2' are connected in series to the resistor R1 and R2, respectively, and, in the case of the 100V system, the switches 41 and 42 connected in parallel to the resistors R1' and R2', respectively, are opened so as to increase the resistance values R1 and R2 up to R1+R1' and R2+R2', respectively.

Examples of the specific numerical values for the various constituents in this case are shown in the table of FIG. 7. Here, the power supply voltage VDD is taken as 5V, the FB terminal voltage Vfb1 at the frequency decreasing initiation is taken as the voltage when the output voltage Vo is Vo=VDD/2 and the FB terminal voltage Vfb2 at the lowest frequency is taken as the voltage when the output voltage Vo is Vo=0. According to the examples of the numerical values, the FB terminal voltage Vfb1 (100V) at the frequency decreasing initiation when the AC power supply 1 is that of the 100V system is established higher than the FB terminal voltage Vfb1 (200V) at the frequency decreasing initiation when the AC power supply 1 is that of 200V system. Moreover, the FB terminal voltages Vfb2 at the lowest frequency are approximately equal both in the 200V system and the 100V system.

Figure 8:
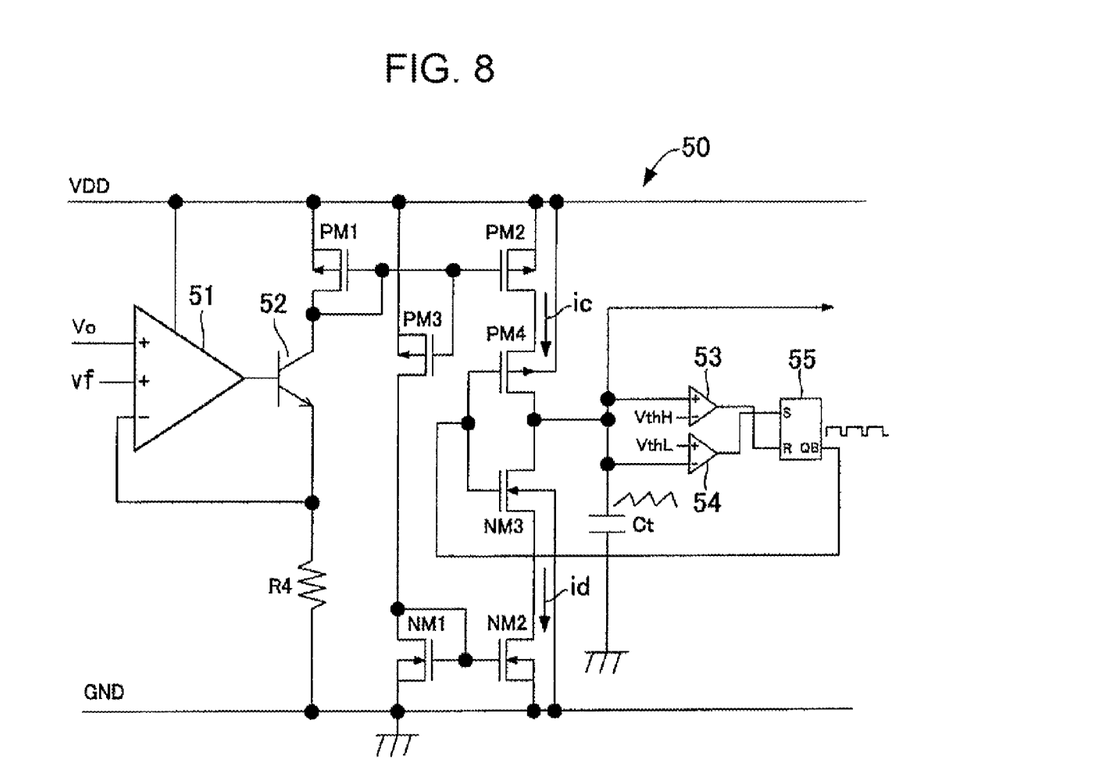
FIG. 8 is a circuit diagram showing an example of the configuration of the variable frequency oscillation unit.

FIG. 8 is a circuit diagram showing an example of the configuration of the variable frequency oscillation unit 50. In the following, transistors PM1 to PM4 are P-channel MOSFETs and transistors NM1 to NM3 are N-channel MOSFETs.

The variable frequency oscillation unit 50 has an amplifier (operational amplifier) 51. To the first non-inverting input terminal of the amplifier 51, the output terminal fbamp_out of the frequency decreasing gain setting unit 40 is connected and the output voltage Vo of the unit 40 is applied. The second non-inverting input terminal of the amplifier 51 is connected to a reference voltage source outputting a reference voltage Vf. The output of the amplifier 51 is connected to the base terminal of an npn transistor 52, the emitter terminal of which is connected to the inverting input terminal of the amplifier 51 and one end of a resistor R4. The other end of the resistor R4 is grounded. The collector terminal of the npn transistor 52 is connected to the drain terminal and the gate terminal of the transistor PM1, the source terminal of which is connected to the power supply of the power supply voltage VDD.

The gate terminal of the transistor PM1 is connected to the gate terminal of the transistor PM2, the source terminal of which is connected to the power supply of the power supply voltage VDD. The gate terminal of the transistor PM1 is also connected to the gate terminal of the transistor PM3, the source terminal of which is connected to the power supply of the power supply voltage VDD. Therefore, the transistor PM1 and the transistor PM2 forms a first current mirror circuit and the transistor PM1 and the transistor PM3 forms a second current mirror circuit.

The drain terminal of the transistor PM3 is connected to the drain terminal and the gate terminal of the transistor NM1, the source terminal of which is grounded. The gate terminal of the transistor NM1 is connected to the gate terminal of the transistor NM2, the source terminal of which is grounded. Therefore, the transistor NM1 and the transistor NM2 forms a third current mirror circuit The drain terminal of the transistor PM2 is connected to the source terminal of the transistor PM4, the back gate terminal of which is connected to the power supply of the power supply voltage VDD. The drain terminal of the transistor PM4 is connected to the drain terminal of the transistor NM3 and the gate terminal of the transistor PM4 is connected to the gate terminal of the transistor NM3. The source terminal of the transistor NM3 is connected to the drain terminal of the transistor NM2 and the back gate terminal of the transistor NM3 is grounded. Here, the transistor PM4 forms a switch turning-on and -off the current in the first current mirror circuit and the transistor NM3 forms a switch turning-on and -off the current in the third current mirror circuit.

The drain terminals of the transistor PM4 and the transistor NM3 are connected to one end of a capacitor Ct, the other end of which is grounded. The one end of the capacitor Ct is connected to the non-inverting input terminal of a comparator 53 and the inverting input terminal of a comparator 54. The inverting input terminal of the comparator 53 is connected to a reference voltage source outputting a reference voltage VthH and the non-inverting input terminal of the comparator 54 is connected to a reference voltage source outputting a reference voltage VthL. The reference voltage VthH and the reference voltage VthL have a relationship expressed as VthH>VthL. This makes the reference voltage VthH establish the upper limit threshold voltage when the capacitor Ct is charged and the reference voltage VthL establish the lower limit voltage when the capacitor Ct is discharged.

The output terminal of the comparator 53 is connected to the reset input terminal R of an RS flip-flop 55 and the output terminal of the comparator 54 is connected to the set input terminal S of the RS flip-flop 55. The inverted output terminal QB of the RS flip-flop 55 is connected to the gate terminals of the transistor PM4 and the transistor NM3. Moreover, one end of the capacitor Ct is connected to the output terminal of the variable frequency oscillation unit 50. The output terminal of the variable frequency oscillation unit 50 is connected to the input terminal of the driving circuit 60 in the next stage.

The variable frequency oscillation unit 50 has a configuration which receives the output voltage Vo, which varies according to a load factor, from the frequency decreasing gain setting unit 40, converts the output voltage Vo to a current and outputs a pulse signal with a period varies according to the magnitude of the current.

The amplifier 51, of the voltage Vo inputted to the first non-inverting input terminal and the voltage of inputted to the second non-inverting input terminal, chooses a voltage with a lower value and amplifies a differential voltage between the chosen voltage and the voltage inputted to the inverting input terminal, which is in a virtual short with the non-inverting input terminal with the lower input voltage. Thus, a constant current flows in the resistor R4 with the current value given by dividing the voltage value at the non-inverting input terminal with a smaller input voltage by the resistance value of the resistor R4. The constant current makes a constant current equivalent thereto flow as a charging current ic charging the capacitor Ct through the transistor PM4 forming a switch by the first current mirror circuit formed with the transistor PM1 and the transistor PM2. Moreover, the constant current also makes a constant current equivalent thereto flow in the transistor NM1 by the second current mirror circuit formed with the transistor PM1 and the transistor PM3. The constant current flowing in the transistor NM1 makes a constant current equivalent thereto transmitted to the third current mirror circuit formed with the transistor NM1 and the transistor NM2. The constant current transmitted to the third current mirror circuit flows as a discharging current id discharged from the capacitor Ct through the transistor NM3 forming a switch.

The voltage across the capacitor Ct is compared with the reference voltages VthH and VthL by the comparators 53 and 54, respectively. The voltage across the capacitor Ct becoming higher than the reference voltage VthH resets the RS flip-flop 55, and the voltage becoming lower than the reference voltage VthL sets the RS flip-flop 55. The RS flip-flop 55 carries out on-off control of the transistor PM4 and the transistor NM3 by the pulse signal outputted from the inverted output terminal QB to repeat the charging and discharging of the capacitor Ct, which makes the capacitor Ct output a triangular wave from the one end thereof.

Here, when the switching power supply system is in operation with a load factor being high, the output voltage Vo supplied from the frequency decreasing gain setting unit 40 becomes higher than the reference voltage vf. When the output voltage Vo is higher than the reference voltage vf, the amplifier 51 produces a constant current corresponding to the reference voltage vf. The constant current, by the transistor PM4 and the transistor NM3 being exclusively subjected to on-off control, becomes the charging current ic or the discharging current id, by which the capacitor Ct is alternately charged and discharged by the constant current with the terminal voltage thereof become a triangular voltage. The triangular voltage is compared with the reference voltage VthH in the comparator 53 to become a series of periodic binary signals resetting the RS flip-flop 55. Moreover, the triangular voltage is also compared with the reference voltage VthL in the comparator 54 to become a series of periodic binary signals setting the RS flip-flop 55. The triangular wave at this time has the shortest period, by which the variable frequency oscillation unit 50 is to provide an oscillation at the highest frequency. The oscillation frequency is far higher than the frequencies in the audible region to be, for example, a fixed frequency of 65 kHz.

Next, when a decrease in the load factor decreases the output voltage Vo to be lower than the reference voltage vf, the amplifier 51 produces a constant current corresponding to the output voltage Vo. The constant current is smaller than the constant current corresponding to the reference voltage vf. Thus, the period of charging and discharging the capacitor Ct is lengthened with the accompanied decrease in the oscillation frequency.

In the following, an explanation will be made with respect to the operation of the control circuit 8 when switching is carried out between two kinds of frequency decreasing gain characteristics, the frequency decreasing gain characteristic in the case when the AC power supply 1 of the switching power supply system is for the 200V system and the frequency decreasing gain characteristic in the case when the AC power supply 1 is for the 100V system.

Figure 9:
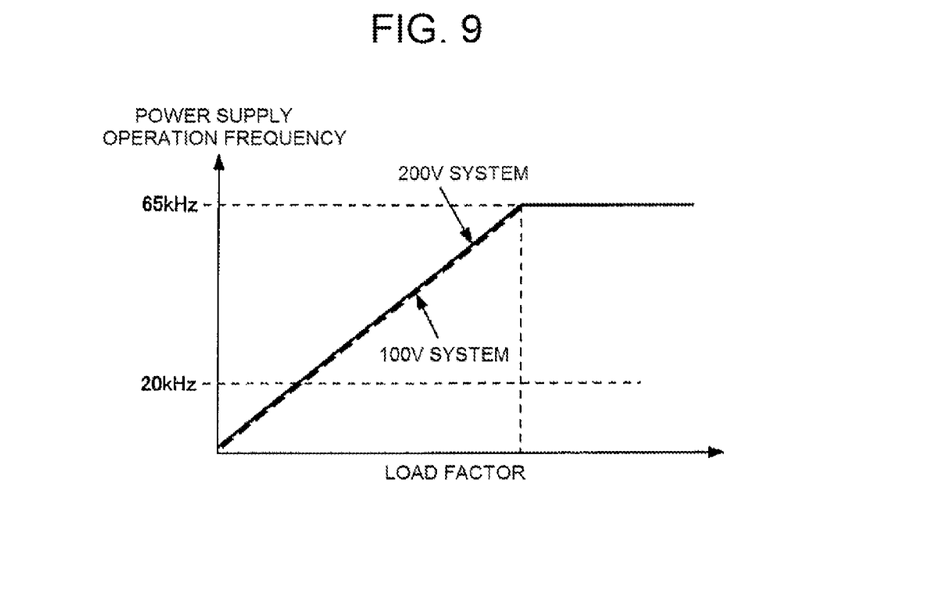
FIG. 9 is a characteristic diagram showing the characteristics of power supply operation frequency to the load factor in the control circuit.

FIG. 9 is a characteristic diagram showing characteristics of the power supply operation frequency relative to the load factor in the control circuit 8.

According to the control circuit 8, in the frequency decreasing gain setting unit 40, as is observed in FIG. 6 showing the characteristics of the output voltage Vo relative to the FB terminal voltage corresponding to the characteristics of the power supply operation frequency relative to the load factor, the inclination in the gain characteristic and the minimum frequency were adjusted so that the FB terminal voltage Vfb1 (100V), at which a frequency decrease is initiated in the frequency decreasing gain characteristic of the 100V system, is shifted to the side of a voltage higher than the FB terminal voltage Vfb1 (200V), at which a frequency decrease is initiated in the frequency decreasing gain characteristic of the 200V system. This makes, when the FB terminal voltage Vfb is decreasing, the power supply operation frequency in the case of the 100V system come to initiate a decrease earlier than the power supply operation frequency in the case of the 200V system does. As a result, the characteristics explained before, in which the power supply operation frequency in the case of the 200V system comes to initiate a decrease earlier than the power supply operation frequency in the case of the 100V system does, is cancelled. Thus, in the switching power supply system according to the invention, the characteristics of power supply operation frequencies relative to the load factor become approximately equal to each other as shown in FIG. 9 both by the use of the AC power supply 1 in the 100V system and by the use of the AC power supply 1 in the 200V system. Therefore, when the switching power supply system is operated at a low-load factor with different AC input voltages, the timings, at each of which the decreasing power supply operation frequency enters the audible region, can be made to be equal to each other regardless of the difference in the AC input voltages. This means that there is no need of individually carrying out adjustment for vibration isolation according to the magnitude of the AC voltage being used.

In the embodiment described in the foregoing, as a circuit configuration for making a frequency decreasing gain variable, the configuration was provided in which a switch is connected in parallel to one of two resistors connected in series so as to make the one resistor short-circuited or brought into a series connection to the other resistor by closing or opening the switch. However, a circuit configuration can be provided in which a switch is connected in series to one of two resistors connected in parallel so as to make the one resistor brought into a parallel connection to or disconnected from the other resistor by closing or opening the switch.

In addition, in the embodiment described in the foregoing, with respect to the characteristics of the power supply operation frequency to the load factor, the frequency decreasing gain on the low voltage system side is adjusted so that the characteristic in the low-voltage system is made to fit to the characteristic in the high-voltage system. However, the frequency decreasing gain on the high-voltage system side may be adjusted so that the characteristic in the high-voltage system is made to fit to the characteristic in the low-voltage system.

While the present invention has been particularly shown and described with reference to the preferred embodiment thereof, it will be understood by those skilled in the art that the foregoing and other changes in form and details can be made therein without departing from the spirit and scope of the present invention.

What is claimed is:

1. A control circuit of a switching power supply system wherein the switching power supply system is a flyback-type switching power supply system comprising a switching device and a transformer, in which system the switching device carries out a turning-on operation to thereby input a DC voltage, to which an AC input voltage is rectified, to the transformer to store energy in the transformer and carries out a turning-off operation to thereby release the energy stored in the transformer for outputting a specified DC voltage to a load, and the control circuit carries out control so as to decrease a switching frequency of the switching device when a load factor of the load decreases to be lower than a specified load factor, the control circuit comprising:
   an input voltage detection unit having the AC input voltage inputted for detecting whether the AC input voltage is a voltage of a high voltage system or a voltage of a low voltage system; and
   a frequency decreasing gain setting unit provided so as to switch decreasing gain characteristics of switching frequencies relative to the load factor according to a result of the detection of the AC input voltage carried out by the input voltage detection unit.

2. The control circuit of a switching power supply system according to claim 1 wherein the frequency decreasing gain setting unit sets a load factor at which the switching frequency initiates a decrease when the AC input voltage is the voltage of the low voltage system at a load factor higher than a load factor at which the switching frequency initiates a decrease when the AC input voltage is the voltage of the high voltage system, thereby making a decreasing gain characteristic of the switching frequency relative to the load factor when the AC input voltage is the voltage of the high voltage system and a decreasing gain characteristic of the switching frequency relative to the load factor when the AC input voltage is the voltage of the low voltage system approximately equal to each other.

3. The control circuit of a switching power supply system according to claim 1 wherein the frequency decreasing gain setting unit comprises:
   an amplifier having a first input terminal as an inverting input terminal and a second input terminal as a non-inverting input terminal, the first input terminal having a feedback signal inputted thereto, the feedback signal corresponding to the voltage outputted to the load;
   a first resistor, a second resistor, a third resistor and a fourth resistor connected in series between ground and a power supply voltage;
   a fifth resistor one end of which is connected to an output of the amplifier and another end of which is connected to a connection point of the second input terminal of the amplifier, the second resistor and the third resistor;
   a first switch connected in parallel to the first resistor; and
   a second switch connected in parallel to the fourth resistor, the first and second switches being made to be opened when the input voltage detection unit detects the voltage of the low voltage system, and being made to be closed when the input voltage detection unit detects the voltage of the high voltage system.

4. The control circuit of a switching power supply system according to claim 3 further comprising a variable frequency oscillation unit determining the switching frequency by an output voltage of the amplifier.

5. The control circuit of a switching power supply system according to claim 1 wherein the input voltage detection unit comprises:
   a comparator having a threshold voltage value between a peak value of the AC input voltage of the high voltage system and a peak value of the AC input voltage of the low voltage system to compare a threshold voltage with the AC input voltage; and
   a circuit holding a signal indicating whether or not the comparator detects that the AC input voltage is higher than the threshold voltage in a half period of the AC input voltage,
   the held signal being used for switching the decreasing gain characteristics of the switching frequencies in the frequency decreasing gain setting unit.

6. A switching power supply system wherein the switching power supply system is a flyback-type switching power supply system comprising a switching device, a transformer and a control circuit, in which system the switching device carries out a turning-on operation to thereby input a DC voltage, to which an AC input voltage is rectified, to the transformer to store energy in the transformer and carries out a turning-off operation to thereby release the energy stored in the transformer for outputting a specified DC voltage to a load, and the control circuit carrying out control so as to decrease a switching frequency of the switching device when a load factor of the load decreases to be lower than a specified load factor, the control circuit comprising:
   an input voltage detection unit having the AC input voltage inputted for detecting whether the AC input voltage is a voltage of a high voltage system or a voltage of a low voltage system;
   a frequency decreasing gain setting unit switching decreasing gain characteristics of switching frequencies relative to the load factor according to a result of the detection of the AC input voltage carried out by the input voltage detection unit to carry out control so that a decreasing gain characteristic of the switching frequency relative to the load factor when the AC input voltage is the voltage of the high voltage system and a decreasing gain characteristic of the switching frequency relative to the load factor when the AC input voltage is the voltage of the low voltage system become approximately equal to each other; and
   a variable frequency oscillation unit determining the switching frequency by an output voltage of the frequency decreasing gain setting unit.

7. An apparatus, comprising:
   an input voltage detection unit configured to determine whether an input voltage is of a first type of system or of a second type of system, and output a corresponding signal; and
   a frequency decreasing gain characteristic setting unit configured to, based on the signal, cause a frequency decreasing gain characteristic corresponding to the first type of system to be approximately equal to a frequency decreasing gain characteristic corresponding to the second type of system.

8. The apparatus of claim 7, wherein the frequency decreasing gain characteristic setting unit is configured to, in response to the signal, set a level of a load factor.

9. The apparatus of claim 8, wherein the frequency decreasing gain characteristic setting unit is configured to, based on the signal indicating that the input voltage is of the first type of system, set the level of the load factor to be different from a level of the load factor corresponding to the second type of system.

10. The apparatus of claim 9, further comprising a frequency setting unit configured to, based on the level of the load factor set by the frequency decreasing gain characteristic setting unit, set a corresponding operating frequency.

* * * * *